United States Patent
Lee et al.

(10) Patent No.: US 7,853,649 B2
(45) Date of Patent: Dec. 14, 2010

(54) AUDIO PROCESSING FOR IMPROVED USER EXPERIENCE

(75) Inventors: Michael M. Lee, San Jose, CA (US); Derek B. Barrentine, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1077 days.

(21) Appl. No.: 11/525,670

(22) Filed: Sep. 21, 2006

(65) Prior Publication Data
US 2008/0084981 A1 Apr. 10, 2008

(51) Int. Cl.
G10L 21/00 (2006.01)
(52) U.S. Cl. .................. 709/204; 455/518; 379/202.01
(58) Field of Classification Search .............. 455/414.1, 455/556.2, 518; 709/204
See application file for complete search history.

(56) References Cited

U.S. PATENT DOCUMENTS

| | | | |
|---|---|---|---|
| 6,011,851 A | | 1/2000 | Connor et al. |
| 6,954,652 B1 | | 10/2005 | Sakanashi |
| 2002/0045438 A1 | | 4/2002 | Tagawa et al. |
| 2006/0181608 A1 * | | 8/2006 | Knappe et al. ........... 348/14.09 |
| 2007/0025538 A1 * | | 2/2007 | Jarske et al. ........... 379/202.01 |
| 2007/0078543 A1 * | | 4/2007 | Wakefield ................... 700/94 |
| 2007/0135102 A1 * | | 6/2007 | Kister et al. ............. 455/414.1 |
| 2007/0206829 A1 * | | 9/2007 | Weinans et al. ............. 381/370 |
| 2007/0263823 A1 * | | 11/2007 | Jalava et al. ........... 379/202.01 |
| 2008/0004729 A1 * | | 1/2008 | Hiipakka ...................... 700/94 |
| 2008/0004866 A1 * | | 1/2008 | Virolainen et al. .......... 704/205 |
| 2008/0046937 A1 * | | 2/2008 | Smith et al. ................... 725/89 |
| 2009/0117953 A1 * | | 5/2009 | Oh .......................... 455/575.1 |

FOREIGN PATENT DOCUMENTS

EP 1 515 570 3/2005

OTHER PUBLICATIONS

International Search Report dated May 2, 2008 in PCT Application No. PCT/US2007/079239.
Written Opinion dated May 2, 2008 in PCT Application No. PCT/US2007/079239.

* cited by examiner

Primary Examiner—Creighton Smith
(74) Attorney, Agent, or Firm—Beyer Law Group LLP

(57) ABSTRACT

Methods and systems that facilitate enhanced media capabilities for electronic devices. The enhanced media capabilities enable electronic devices to provide voice calling with concurrent audio playback. The audio playback can originate at the electronic device itself or can be transmitted to the electronic device as part of or together with the voice calling. In addition, the enhanced media capabilities can also provide users of electronic devices with acoustic separation (e.g., spatial positioning) of audio currently provided from a voice call and from audio playback. Still further, the enhanced media capabilities can also provide users of electronic devices with acoustic separation (e.g., spatial positioning) of participants in multi-party calls.

27 Claims, 13 Drawing Sheets

|   | AUDIO | CALL | CH-L | CH-R |
|---|---|---|---|---|
| 1 | ACTIVE | INACTIVE | AUDIO | AUDIO |
| 2 | INACTIVE | ACTIVE | CALL | CALL |
| 3 | ACTIVE | ACTIVE | AUDIO | CALL |
| 4 | ACTIVE | ACTIVE | MIX | MIX |

AUDIO PROCESSING FOR IMPROVED USER EXPERIENCE

BACKGROUND OF THE INVENTION

1. Field of the Invention

The present invention relates to electronic devices and, more particularly, to enhanced audio processing for electronic devices.

2. Description of the Related Art

Portable electronic devices, such as MP3 players and Personal Digital Assistants (PDAs), support media playback for users of such devices. Traditionally, other portable electronic devices, such as mobile phones, have not offered media playback. Recently, however, mobile telephones have included the functionality of MP3 players so that music can be played back for users of the mobile telephones. Unfortunately, however, when a call is incoming to a mobile telephone, music that might otherwise be played is stopped. After the call has ended, the user can be prompted to return to the music playback if so desired. Hence, music cannot be played while using the mobile telephone to engage in a voice call.

Additionally, mobile telephones and computers (e.g., Internet telephony), can enable users to engage in voice calls with multiple parties. However, one problem with such conventional devices is that a user can easily get confused as to who is talking when there are multiple participants on a voice call.

Thus, there is need to facilitate improved audio capabilities for electronic devices.

SUMMARY OF THE INVENTION

The invention pertains to improved methods and systems that facilitate enhanced media capabilities for electronic devices. The enhanced media capabilities enable electronic devices to provide voice calling with concurrent audio playback. The audio playback can originate at the electronic device itself or can be transmitted to the electronic device as part of or together with the voice calling. In addition, the enhanced media capabilities can also provide users of electronic devices with acoustic separation (e.g., spatial positioning) of audio currently provided from a voice call and from audio playback. Still further, the enhanced media capabilities can also provide users of electronic devices with acoustic separation (e.g., spatial positioning) of participants in multi-party calls.

The invention can be implemented in numerous ways, including as a method, system, device, apparatus (including graphical user interface), or computer readable medium. Several embodiments of the invention are discussed below.

As a method for handling an incoming call at a portable electronic device having wireless communication support as well as media playback support, one embodiment of the invention includes at least: receiving an incoming voice call from a calling party; determining whether audio playback of a media item is provided while receiving the incoming voice call; and controlling audio output so that a user of the portable electronic device can hear not only the incoming voice call but also the audio playback of the media item when it is determined that the audio playback is provided while receiving the incoming voice call.

As a method for operating a portable electronic device having a media playback subsystem, a wireless communication subsystem and first and second speakers, one embodiment of the invention includes at least the acts of: playing back a media item by the media playback subsystem using first and second audio output channels respectively provided to the first and second speakers; receiving an incoming communication call to the wireless communication subsystem; altering the playing back of the media item while the incoming communication call is being received so as to provide a mono audio output channel to the second speaker and no audio output channel to the first speaker; and outputting the incoming call by providing a communication channel to the first speaker while the incoming communication call is being received.

As a method for operating a portable electronic device having a media playback subsystem, a wireless communication subsystem and first and second speakers, one embodiment of the invention includes at least the acts of: receiving audio for a media item being played back by the media playback subsystem; receiving an incoming communication call to the wireless communication subsystem; altering the audio pertaining to the incoming communication call and audio from the media item being played back so as to appear to be originating from different virtual positions; and producing a resulting audio by supplying to the first and second speakers both the altered audio for the incoming communication call and the altered audio for the media item being played back.

As a portable electronic device, one embodiment of the invention includes at least: an audio playback subsystem that plays back one or more stored media items; a communication subsystem that supports a voice call; and an audio manager that operates to determine whether audio playback of a stored media item is to be provided while engaging in a voice call, and to direct audio output so that a user of the portable electronic device can hear not only the voice call but also the audio playback of the stored media item when it is determined that the audio playback is provided while engaging in the voice call.

As a method for providing a multi-party call on a communication device having associated therewith at least two speakers available for audio output, the multi-party call being with a user of the communication device and a plurality of other participants, one embodiment of the invention includes at least the acts of: assigning the participants to virtual positions; receiving call audio from the participants during the multi-party call; adapting the call audio by the participants based on the virtual positions corresponding thereto; and presenting the adapted call audio to the at least two speakers associated with the communication device.

As a graphical user interface for use in managing virtual locations for a plurality of participants to a multi-party call, one embodiment of the invention includes at least a plurality of visually distinct regions, and a visual indication for at least a plurality of the participants. The visual indication for at least one of the participants can be assigned to a different one of the visually distinct regions, thereby causing an audio sound associated with the participant to be spatially adapted to originate from a virtual location corresponding to the visually distinct region.

As a portable communication device having at least two speakers available for audio output, one embodiment of the invention includes at least: a communication subsystem that supports a multi-party call, the multi-party call being between a user of the portable communication device and a plurality of other participants; and an audio manager that operates to assign the participants to virtual positions, receive call audio from the participants during the multi-party call, adapt the call audio by the participants based on the virtual positions corresponding thereto, and send the adapted call audio to the at least two speakers.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved methods and systems that facilitate enhanced media capabilities for electronic devices. The enhanced media capabilities enable electronic devices to provide voice calling with concurrent audio playback. The audio playback can originate at the electronic device itself or can be transmitted to the electronic device as part of or together with the voice calling. In addition, the enhanced media capabilities can also provide users of electronic devices with acoustic separation (e.g., spatial positioning) of audio currently provided from a voice call and from audio playback. Still further, the enhanced media capabilities can also provide users of electronic devices with acoustic separation (e.g., spatial positioning) of participants in multi-party calls.

"Media data," as used herein, is digital data that pertains to at least one of audio, video, and image. Some examples of specific forms of media data (which can be referred to as "media items") include, but are not limited to, songs, albums, audiobooks, playlists, movies, music videos, photos, computer games, podcasts, audio and/or video presentations, news reports, and sports updates.

Embodiments of the invention are discussed below with reference to FIGS. 1-10D. However, those skilled in the art will readily appreciate that the detailed description given herein with respect to these figures is for explanatory purposes as the invention extends beyond these limited embodiments.

Various aspects, embodiments and implementations of media utilization are described below. These aspects, embodiments and implementations can be utilized separately or in any combination.

One aspect of the invention pertains to a wireless system that supports both wireless communications and media playback. The wireless communications and the media playback can be concurrently supported. Consequently, a user is able to not only participate in a voice call but also hear audio playback at the same time.

Figure 1:
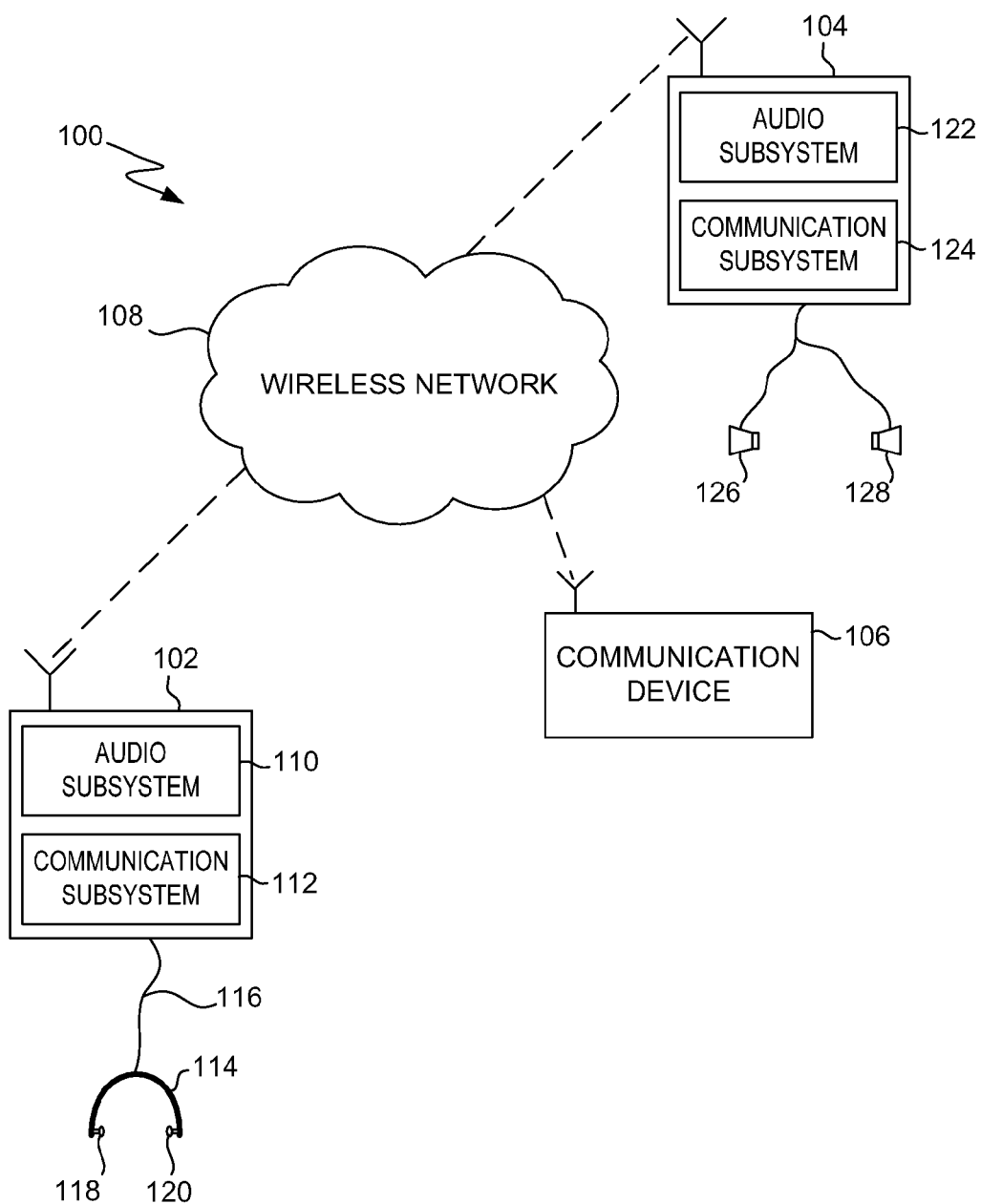
FIG. 1 is a block diagram of a wireless audio system according to one embodiment of the invention.

FIG. 1 is a block diagram of a wireless system 100 according to one embodiment of the invention. The wireless system 100 includes one or more portable electronic devices. In particular, portable electronic devices 102 and 104 are illustrated in FIG. 1. The wireless system 100 supports one or more communication devices, such as the communication device 106 illustrated in FIG. 1. As an example, the communication device 106 can be a mobile telephone.

The portable electronic device 102 includes an audio subsystem 110 and a communication subsystem 112. The portable electronic device 102 can store audio items that can be played by the audio subsystem 110. A user of the portable electronic device 102 can utilize a headset 114 that can couple (wired or wirelessly) via a link 116 to the portable electronic device 102. The headset 114 typically has a left speaker 118 and a right speaker 120. Through use of the headset 114, the user of the portable electronic device 102 is able to hear audio items played by the audio subsystem 102 as well as voice calls being received by the communication subsystem 112. The manner by which the portable electronic device 102 facilitates delivery of audio playback of media items as well as audio for voice calls is described in further detail below.

The portable electronic device 104 includes an audio subsystem 122 and a communication subsystem 124. The audio subsystem 122 allows the portable electronic device 104 to playback audio items. The communication subsystem 124 allows the portable electronic device 104 to participate in voice calls through the wireless network 108. The portable electronic device 104 enables a user to hear audio output from either or both of the audio subsystem 122 and the communication subsystem 124 at speakers 126 and 128. The speakers 126 and 128 can correspond to left and right speakers, respectively. The speakers 126 and 128 can also be referred to as earphones. Again, the manner by which the portable electronic device 104 manages the output of audio from the audio subsystem 122 and the communication subsystem 124 are discussed in greater detail below.

The portable electronic devices 102 and 104 support not only media playback but also wireless communications. As one example, the portable electronic devices 102 and 104 can correspond to mobile telephones that include audio capabilities. As another example, the portable electronic devices 102 and 104 can pertain to media playback devices (e.g., MP3 players) that include communication capabilities. As still another example, the portable electronic devices 102 and 104 can pertain to a personal digital assistant that includes media playback as well as communication capabilities.

In one embodiment, the form factor for the portable electronic devices 102 and 104 (as well as the communication device 106) can be hand-held (or palm-sized) or pocket-sized devices. In one embodiment, the form factor of the portable electronic devices is hand-held or smaller. The portable electronic devices may, for example, be small and lightweight enough to be carried in one hand, worn, or placed in a pocket (of a user's clothing). Although the form factor is generally small and hand-held (or palm-sized), the configuration of the device can vary widely.

Figure 2:
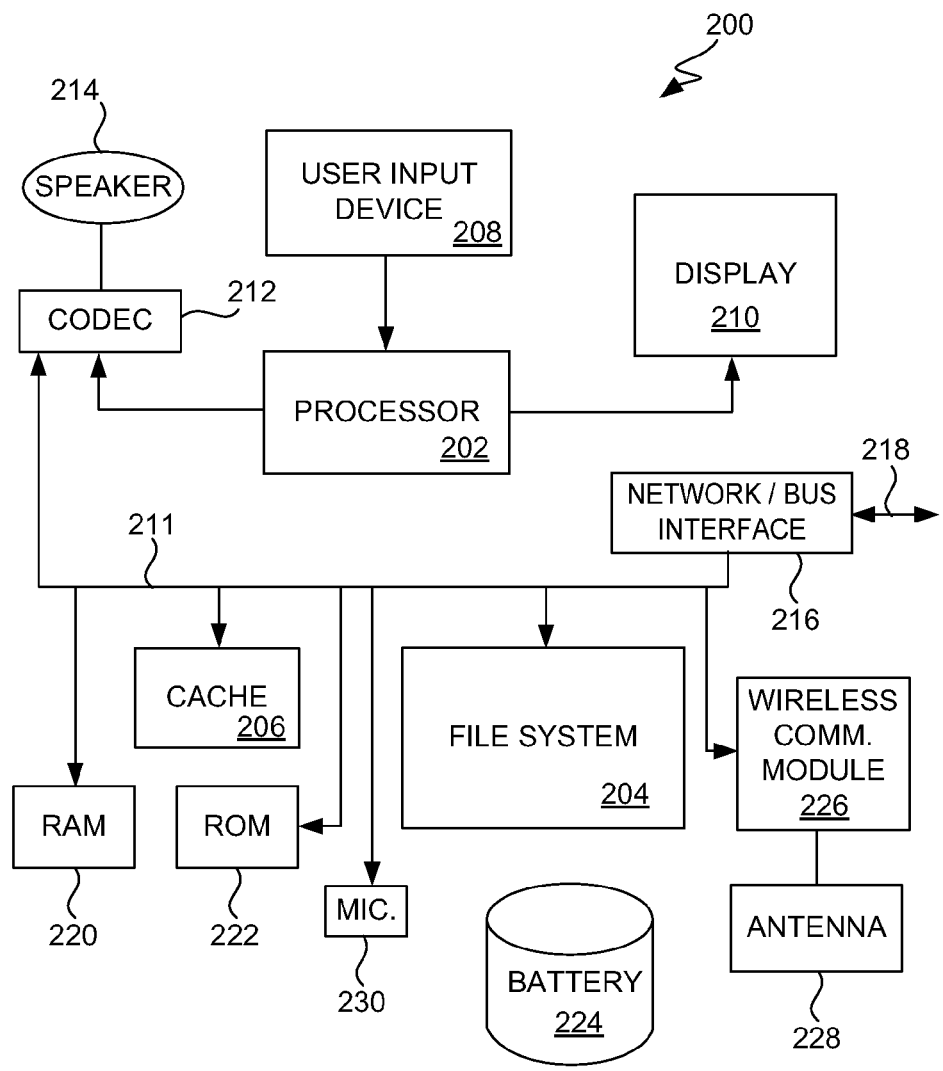
FIG. 2 is a block diagram of a media player suitable for use with the invention.

FIG. 2 is a block diagram of a media device 200 suitable for use with the invention. The media device 200 can illustrate representative circuitry of the portable electronic devices 102 and 104 in FIG. 1.

The media device 200 includes a processor 202 that pertains to a microprocessor or controller for controlling the overall operation of the media device 200. The media device 200 stores media data pertaining to media items in a file system 204 and a cache 206. The file system 204 can be implemented by semiconductor memory (e.g., EEPROM, Flash, etc.) or by at least one storage disk. The file system 204 typically provides high capacity storage capability for the media device 200. However, since the access time to the file system 204 is relatively slow, the media device 200 can also include a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is often a concern when the media device 200 is a portable media player that is powered by a battery (not shown). The media device 200 also includes a RAM 220 and a Read-Only Memory (ROM) 222. The ROM 222 can store programs, utilities or processes to be executed in a non-volatile manner. The RAM 220 provides volatile data storage, such as for the cache 206.

The media device 200 also includes a user input device 208 that allows a user of the media device 200 to interact with the media device 200. For example, the user input device 208 can take a variety of forms, such as a button, keypad, touchpad, dial, etc. Still further, the media device 200 includes a display 210 (screen display) that can be controlled by the processor 202 to display information to the user. A data bus 211 can facilitate data transfer between at least the file system 204, the cache 206, the processor 202, and the CODEC 212.

In one embodiment, the media device 200 serves to store a plurality of media items (e.g., songs) in the file system 204. When a user desires to have the media player play a particular media item, a list of available media items can be displayed on the display 210. Then, using the user input device 208, a user can select one of the available media items. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media device 200 or external to the media device 200. For example, headphones or earphones that connect to the media device 200 would be considered an external speaker.

The media device 200 also includes a bus interface 216 that couples to a data link 218. The data link 218 allows the media device 200 to couple to a host device (e.g., host computer or power source). The data link 218 can also provide power to the media device 200.

The media device 200 further includes wireless communication interface 226 and an antenna 228 to support wireless communication. The wireless communication can pertain to voice or data communications. A microphone 230 can provide voice pickup for an outgoing voice communication. The processor 202 can also operate to control communications (incoming or outgoing) via the wireless communication interface 226. In one embodiment, the processor 202 can execute computer code to effectively operate as an audio manager, a communication manager, a data manager, and a user interface manager.

Figure 3A:
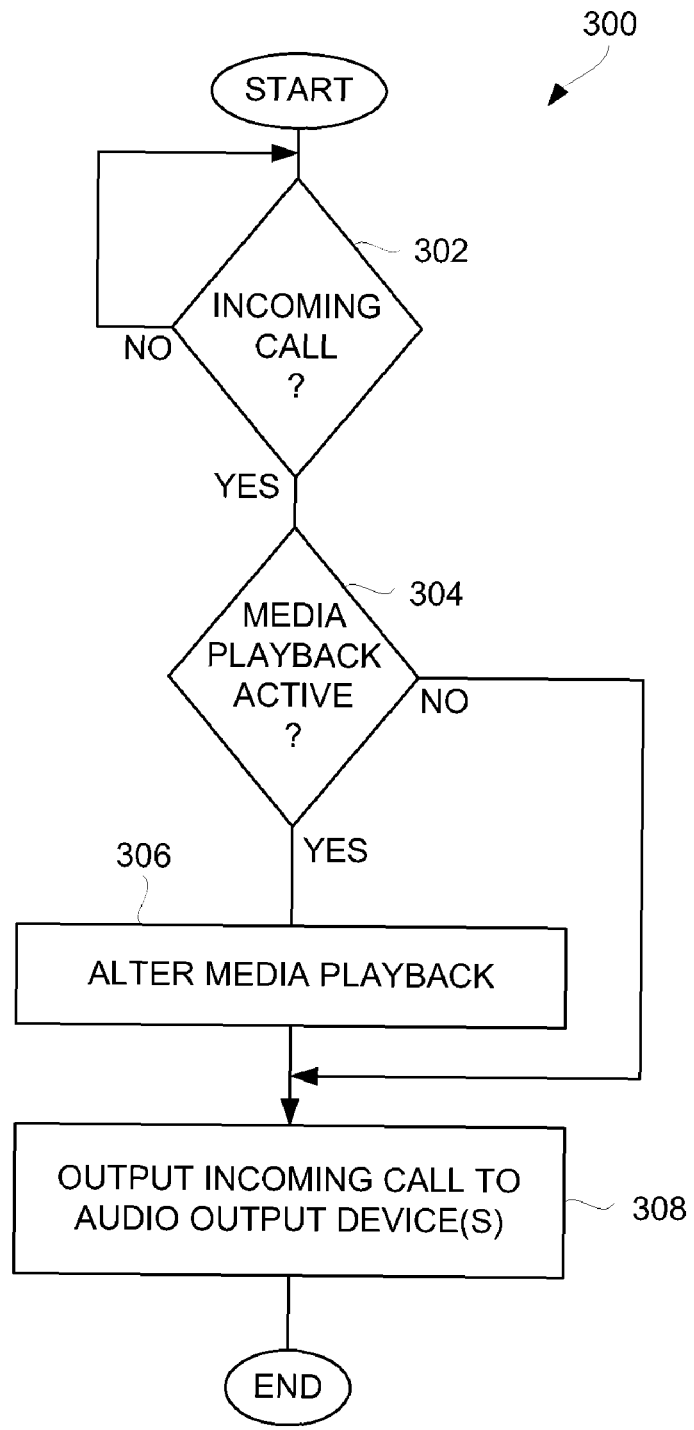
FIG. 3A is a flow diagram of a call reception process according to one embodiment of the invention.

FIG. 3A is a flow diagram of a call reception process 300 according to one embodiment of the invention. The call reception process 300 is, for example, performed by a portable electronic device, such as the portable electronic devices 102 and 104 illustrated in FIG. 1. These portable electronic devices 102 and 104 support media playback capabilities as well as communication capabilities.

The call reception process 300 begins with a decision 302 that determines whether a call is incoming. The incoming call is typically a voice call provided over a wireless communication network. When the decision 302 determines that a call is not incoming, the call reception process 300 awaits an incoming call. On the other hand, when the decision 302 determines that a call is incoming, the call reception process 300 continues. In other words, the call reception process 300 can be deemed to be invoked when a call is incoming.

In any case, once a call is incoming, a decision 304 determines whether media playback is active. When the decision 304 determines that media playback is active, media playback is altered 306. Typically, in this embodiment, the media playback concerns playback of a media item that is already ongoing when the incoming call arrives. The altering 306 of the media playback can be implemented in a variety of different ways. In one implementation, the media playback is modified but not stopped during the incoming call. As one example, the media playback can be directed to one output audio channel, with the incoming call being directed to another output audio channel. Such an approach will allow the user of the portable electronic device to continue to hear the media playback while also hearing the incoming call. As another example, the media playback could be mixed with the incoming call and provided to the user of the portable electronic device as a combined output audio channel. Alternatively, when the decision 304 determines that media playback is not active, the block 306 is bypassed since there is no media playback to be altered.

Following the block 306 or its being bypassed, the call reception process 300 outputs 308 the incoming call to one or more audio output devices. As an example, the audio output devices can correspond to speakers. In one implementation, the speakers can be provided on or within a housing of the portable electronic device. In another implementation, the speakers can be external speakers associated with earphones or a headset. Following the block 308, the call reception process 300 ends.

Figure 3B:
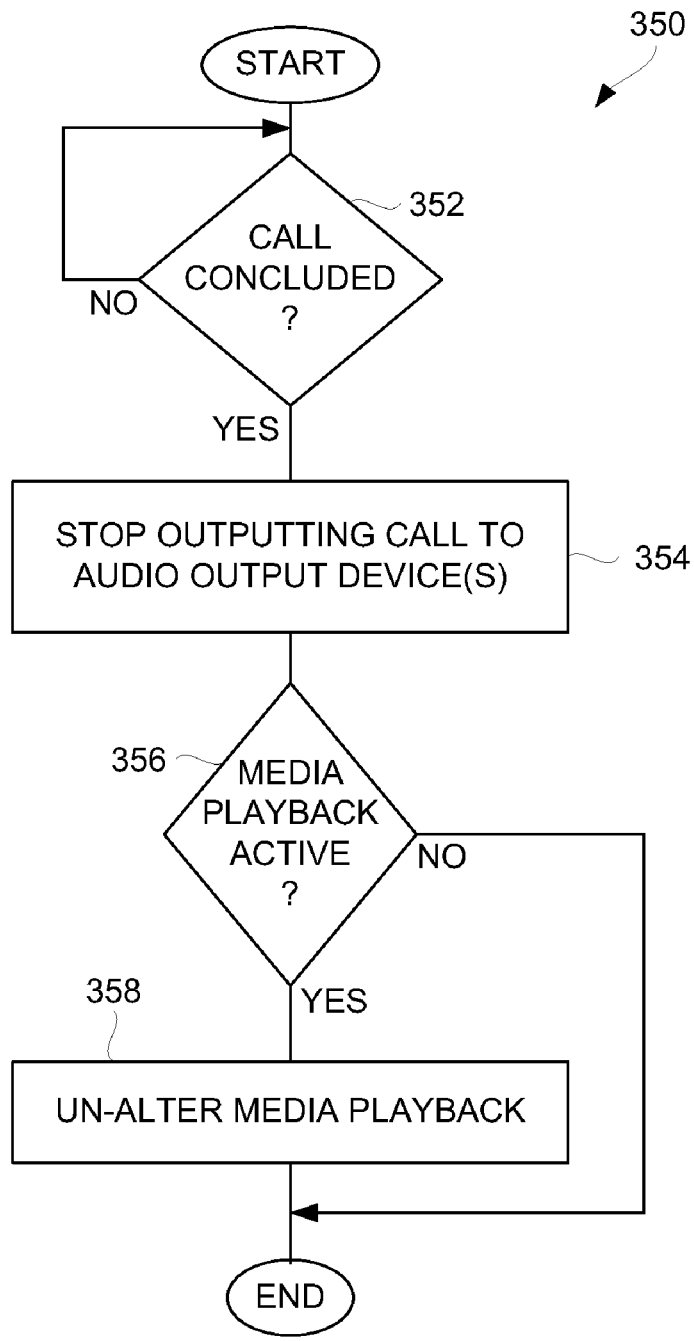
FIG. 3B is a flow diagram of a call determination process according to one embodiment of the invention.

FIG. 3B is a flow diagram of a call termination process 350 according to one embodiment of the invention. The call termination process 350 is performed by a portable electronic device, such as the portable electronic devices 102 and 104 illustrated in FIG. 1. The call termination process 350 can be considered counterpart processing to the call reception process 300 illustrated in FIG. 3A.

The call termination process 350 begins with a decision 352 that determines whether a call has been concluded. When the decision 352 determines that a call has not yet been concluded, then the call termination process 350 awaits termination of the call. On the other hand, when the decision 352 determines that the call has concluded, then the call termination process 350 continues. In other words, the call termination process 350 is performed when a call terminates.

Once the decision 352 determines that a call has concluded, outputting of the call to the one or more audio output devices is stopped 354. A decision 356 then determines whether media playback is active. Here, if media playback was active when the incoming call was received, media playback will typically remain active when the call concludes. Hence, when the decision 356 determines that media playback is active (when the call concludes), the call termination process 350 un-alters 358 the media playback. Since the call reception process 300 altered 306 the media playback when the incoming call arrived, when the call concludes the media playback is un-altered 358. As a result, the media playback is thereafter able to be output in the same manner that it was output before the incoming call. Alternatively, when the decision 356 determines that media playback is not active, then the block 358 is bypassed because no media playback is to be provided. Following the block 358 or its being bypassed, the call termination process 350 ends.

Although the call reception process 300 illustrated in FIG. 3A and the call termination process 350 pertain to processes that alter or un-alter media playback dependent on the presence of a voice call, it should be understood that similar processing can be performed in the other scenarios. As another embodiment, if media playback is initiated when an incoming call is active, then the output of the incoming call can be altered so that both the incoming call and the media playback can be directed to the audio output device(s). When the media playback is no longer active, any prior altering of the output of the incoming call can be un-altered.

Figure 4A:
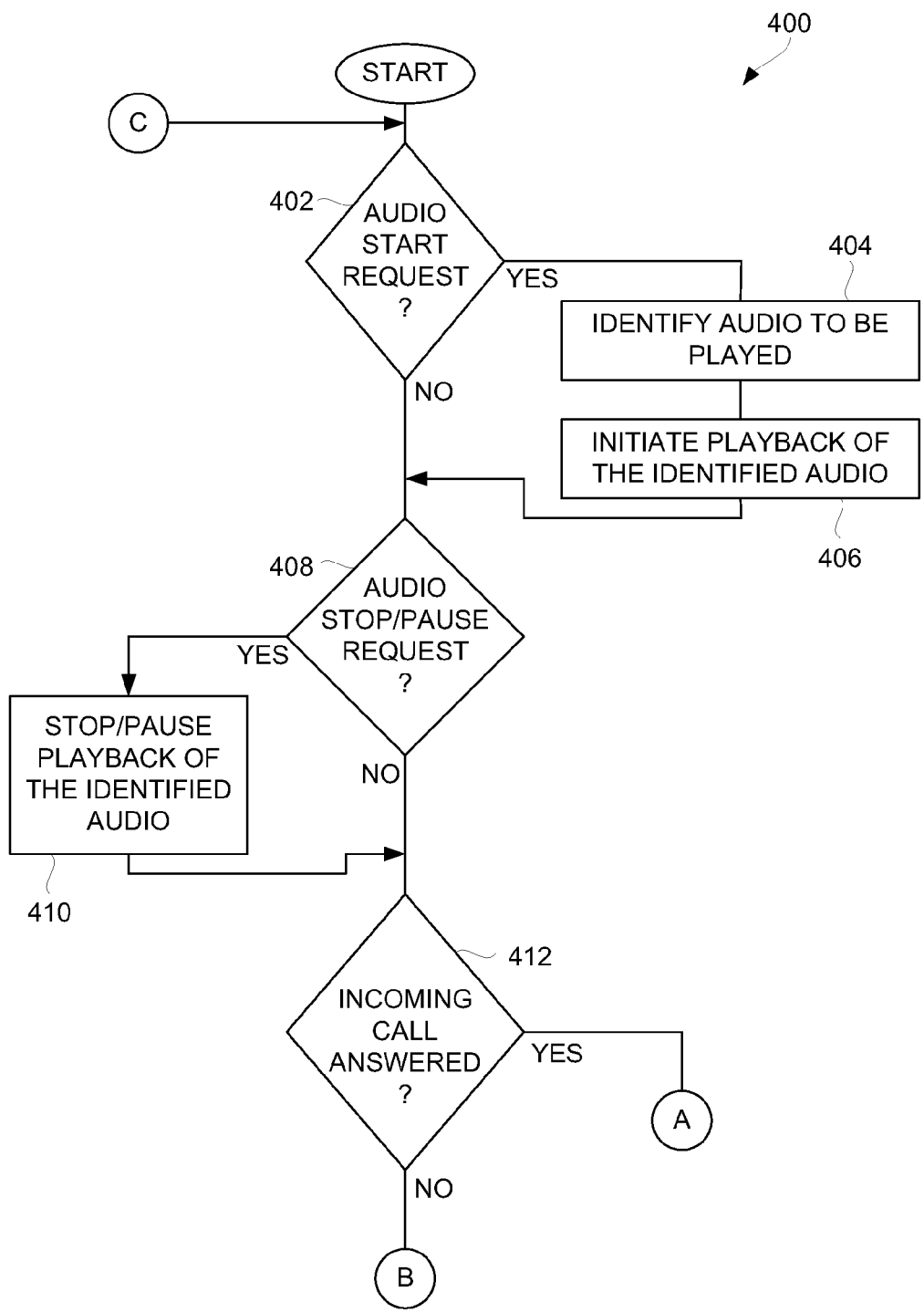
FIGS. 4A-4C are flow diagrams of an audio management process according to one embodiment of the invention.
Figure 4B:
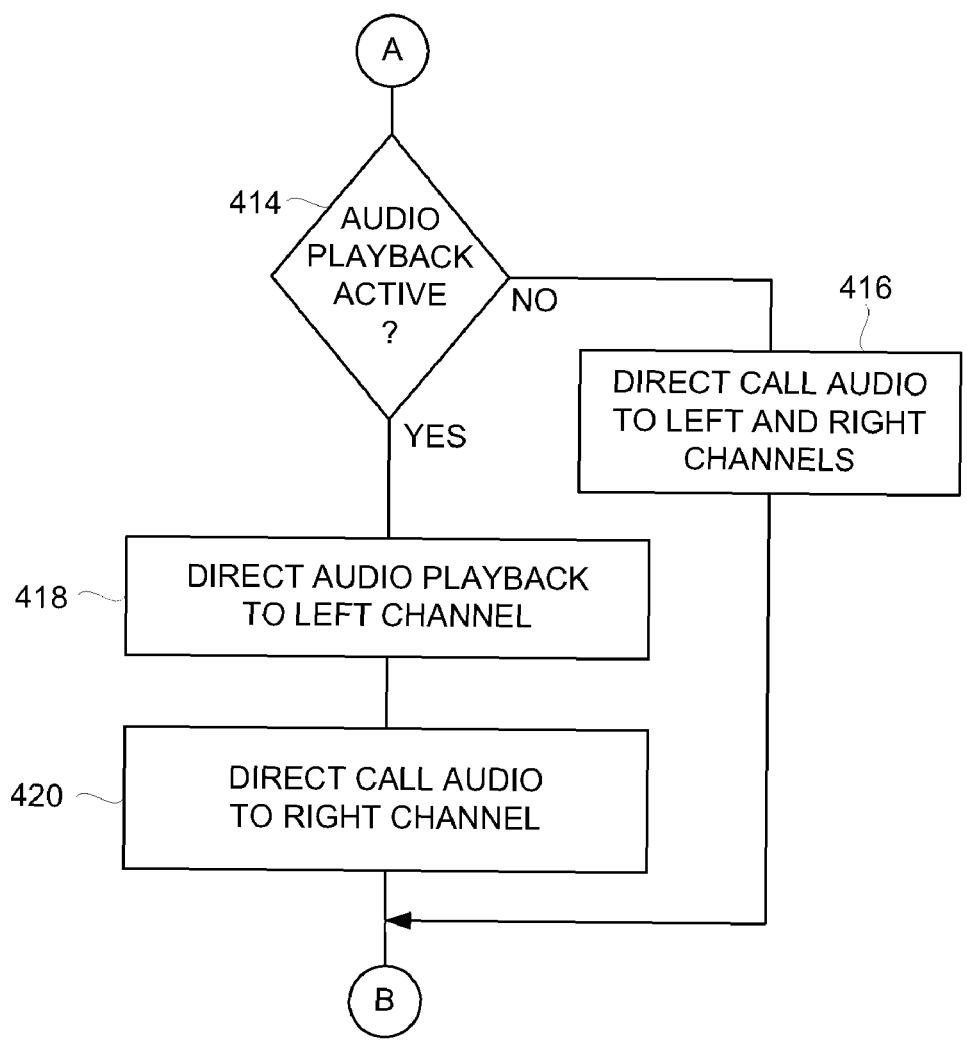
Figure 4C:
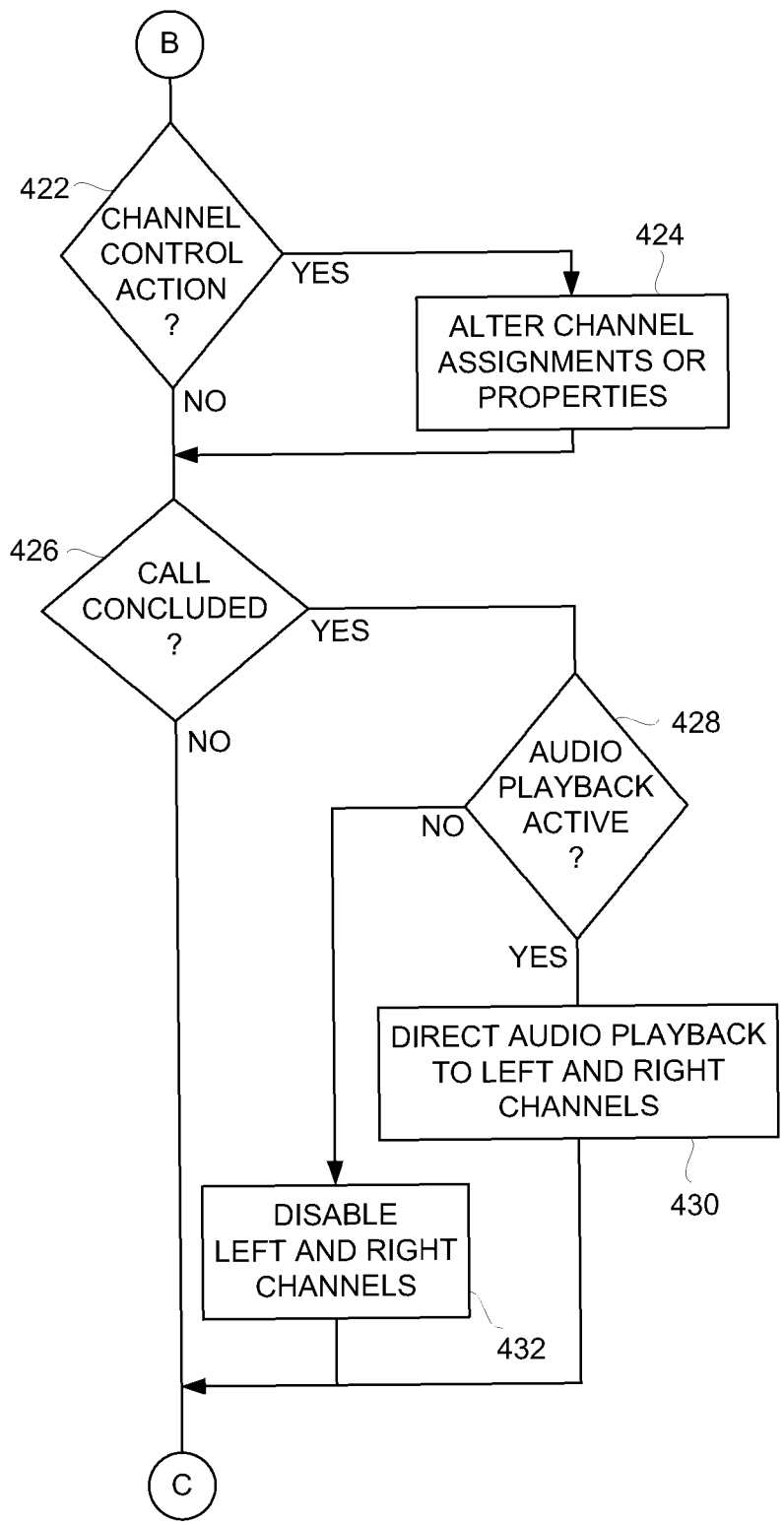

FIGS. 4A-4C are flow diagrams of an audio management process 400 according to one embodiment of the invention. The audio management process 400 is, for example, performed by a portable electronic device. Examples of portable electronic devices include the portable electronic devices 102 and 104 illustrated in FIG. 1.

The audio management process 400 begins with a decision 402 that determines whether an audio start request has been received. Here, a user of the portable electronic device can provide a user input to invoke an audio start request. When the decision 402 determines that an audio start request has been received, audio to be played is identified 404. User input with respect to the portable electronic device can be used to identify 404 the audio to be played. After the audio to be played has been identified 404, playback of the identified audio is initiated 406. As an example, the playback of the identified audio can be performed by the audio subsystem 110 of the portable electronic device 102 illustrated in FIG. 1.

Following the block 406, as well as directly following the decision 402 when an audio start request is not received, a decision 408 determines whether an audio start/pause request has been received. The audio start/pause request can be initiated by user input with respect to the portable electronic device. When the decision 408 determines that an audio stop/pause request has been received, playback of the identified audio is stopped or paused 410.

Following the block 410, as well as directly following the decision 408 when an audio stop/pause request has not been received, a decision 412 determines whether an incoming call has been answered. When the decision 412 determines that an incoming call has been answered, a decision 414 determines whether audio playback is active. When the decision 414 determines that audio playback is not active, the call audio (i.e., audio for the call) is directed 416 to left and right channels. The left and right channels can, for example, correspond to left and right speakers. Alternatively, when the decision 414 determines that audio playback is active, audio playback is directed 418 to a left channel and the call audio is directed 420 to a right channel.

Following the blocks 416 or 420 as well as directly following the decision 412 when an incoming call is not answered, a decision 422 determines whether a channel control action has been received. A channel control action can be associated with a user input that impacts channel assignments or properties. Hence, when the decision 422 determines that a channel control action has been received, channel assignments or properties are altered 424. For example, the channel assignments can be altered 424 by a toggling action that switches different audio channels to different speakers. The channel properties can be altered 424 by adjusting the blending or mixing of different audio channels before being output to a speaker.

Following the block 424, as well as following the decision 424 when a channel control action is not received, a decision 426 determines whether a call has concluded. When the decision 426 determines that a call has concluded, a decision 428 determines whether audio playback is active. Audio playback can be deemed active if the audio playback is active when the call concludes or can be deemed active if audio playback was active when a call was received. When the decision 428 determines that the audio playback is active, audio playback can be directed 430 to left and right channels. Previously, during the call, the audio playback was directed 418 to the left channel and not to the right channel because the right channel carried the call audio. Now, since the call has concluded, the audio playback can be again directed 430 to both the left and right channels. With both left and right channels being available for audio playback, the audio playback can be provided in stereo. Alternatively, when the decision 428 determines that audio playback is not active, left and right channels can be disabled 432. Following the blocks 430 and 432 as well as directly following the decision 426 when the call has not concluded, the audio management process 400 can return to repeat the decision 402 and subsequent blocks so that subsequent requests can be similarly processed.

Figures 5, 6:
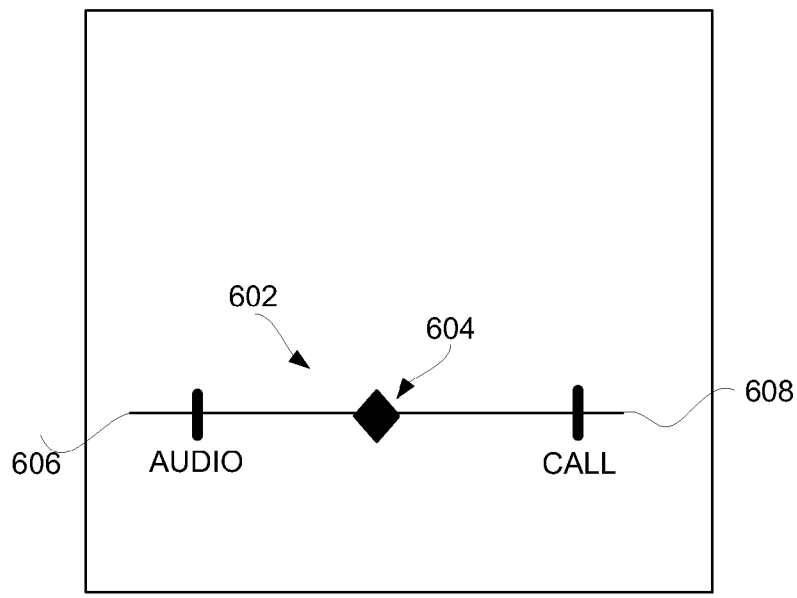
FIG. 5 is a table illustrating representative audio management for a portable electronic device supporting both audio playback and wireless voice communications according to one embodiment of the invention.
FIG. 6 is an exemplary display screen suitable for use on a portable electronic device according to one embodiment of the invention.

FIG. 5 is a table 500 illustrating representative audio management for a portable electronic device supporting both audio playback and wireless voice communications according to one embodiment of the invention. The portable electronic device has a left audio channel and a right audio channel that are able to carry audio signals to left and right speakers, respectively. Hence, the assignment of audio sources for the left and right channels determines what audio content or information is provided to a user of the portable electronic device via the left and right speakers. Four different audio management scenarios are illustrated in the table 500. In the first scenario, audio playback is active but a voice call is inactive. In this case, the media playback is provided to both left and right channels in a stereo fashion. In the second scenario, audio playback is not active but a voice call is active. In this case, the voice call can be output to one or both of the left and right channels. In a third scenario, audio playback as well as a voice call are active. In this case, the audio playback is provided in a mono fashion to the left channel and the voice call is provided to the right channel. Typically, in this situation, a user may interact with the portable media device to alter the channel assignments. For example, by pressing a switch or other input means, the user can cause the audio playback at the left channel to stop and instead provide the voice call to both the left and right channels. In a fourth scenario, the audio playback and voice call are both active. In this case, the audio output to the left and right channels can be a mixture of the audio provided by audio playback and the audio provided by the voice call. A user input action can enable a user to alter the characteristics of the audio mixture. For example, a user input could pause or stop the audio playback. As another example, a user input action could enable a user to alter the relative mixture of the voice call and the audio playback.

FIG. 6 is an exemplary display screen 600 suitable for use on a portable electronic device according to one embodiment of the invention. The display screen 600 can be presented by a display device associated with the portable electronic device. The display screen 600 includes a blend control 602. The blend control 602 allows a user of the portable electronic device to alter the blend (or mixture) of audio from audio playback and audio from a voice call. The blend control 602 is particularly useful for the fourth scenario discussed above with reference to FIG. 5. The blend control 602 includes a slider 604 that can be manipulated by a user towards either an audio end 606 or a call end 608. As the slider 604 is moved towards the audio end 606, the audio playback output gets proportionately greater than the voice call output. On the other hand, when the slider 604 is moved towards the call end 608, the voice call output gets proportionately greater than the audio playback output. For example, the position of the slider 604 can represent a mixture of the audio playback output and the voice call output with each amplified similarly so that the mixture is approximately 50% audio.

Alternatively, instead of using different audio channels, the audio to be concurrently output from an incoming call and media playback can be altered to provide acoustic separation. The audio for each can be altered such that the audio from the incoming call and the audio from the media playback are perceived by a listener (when output to a pair of speakers, either internal or external) as originating from different virtual locations. The different virtual locations can be default positions or user-specified (during playback or in advance). Additional details on establishing or setting virtual location are discussed below.

Another aspect of the invention pertains to transmitting media data from one electronic device to another electronic device while engaging in a voice call between the electronic devices.

In one embodiment, an audio subsystem on an electronic device can control audio output device(s) to produce audio sounds pertaining to a media item. The audio sounds can be directed to a user of the portable electronic device by way of the audio output device(s) (e.g., speaker(s)) within or attached to the electronic device. An attached speaker can be in an earphone or a headset. In addition, the audio sound generated at one portable electronic device can be directed to another electronic device together with audio associated with a voice call. Here, audio for the voice call can be mixed with the audio for the media playback and then transmitted to the another electronic device. The mixed audio can then be output to one or more audio output device(s) (e.g., speakers) associated with the another electronic device. In one implementation, instead of being mixed, the voice call and the media playback can be transmitted using separate channels. In such case, the another electronic device can play the audio for the voice call and the media playback using separate speakers if desired. Also, in such a case, a user of the another electronic device is able to separately control the volume of the different audio channels. As an alternative, predetermined sound effects, which can also be considered media items, can be likewise directed to other portable electronic devices during a voice call.

The sender or recipient of the audio sounds pertaining to a media item can be permitted to separately control the volume or amplitude of the audio sounds pertaining to the media item. As a result, the mixture or blend of the audio sounds pertaining to media items as compared to audio sounds pertaining to the voice call can be individually or relatively controlled.

Still another aspect of the invention pertains to a multi-party communication environment. The various parties to a multi-party communication can be spatially placed such that one or more of the parties is able to more easily distinguish the different parties.

Figure 7:
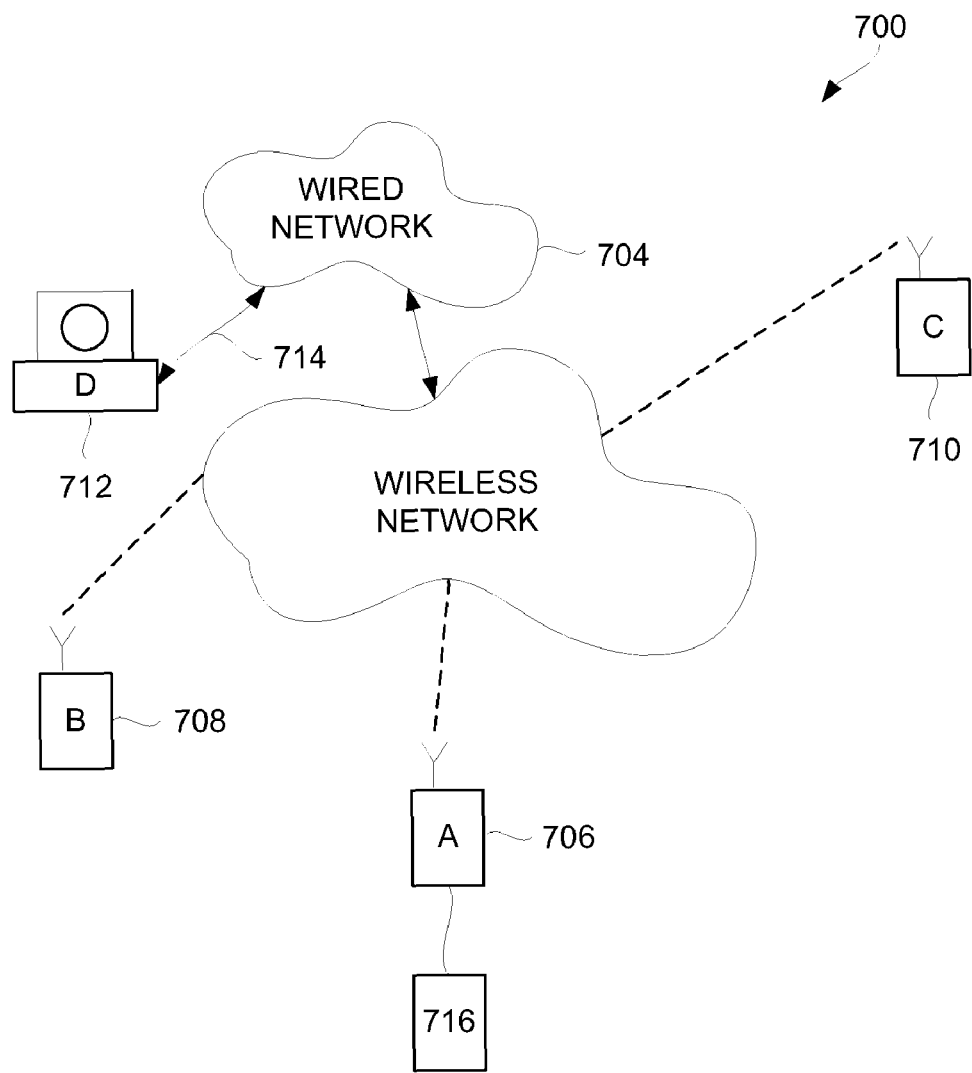
FIG. 7 is a diagram of a multi-party conference system according to one embodiment of the invention.

FIG. 7 is a diagram of a multi-party conference system 700 according to one embodiment of the invention. The multi party conference system 700 includes a wireless network 702 and a wired network 704. The multi-party conference system 700 also includes a plurality of portable electronic devices, including portable communication device 706 (referred to as device A), portable communication device 708 (referred to as device B) and portable communication device 710 (referred to as device C). These portable communication devices 706-710 couple to a wireless network 702. Additionally, the multi-party conference system 700 includes a stationary communication device 712 (referred to as device B). The stationary communication device 712 can, for example, pertain to a desktop computer or a telephone. Typically, the communication device 712 would couple to the wired network 704 over a wired link 714. However, the link 714 could alternatively include a wireless link.

From the perspective of the portable communication device 706 (device A), the multi-party conference system 700 is further described. In this embodiment, the portable communication device 706 includes a headset 716 that couples (wirelessly or wired) to the portable communication device 706. Here, the portable communication device 706 is assumed to be participating in a multi-party conference call with the users of the portable communication devices 708 and 710 as well as the stationary communication device 712. The wired network 704 and/or the wireless network 702 can provide a central office and switching devices needed to have the users of these devices participate in a multi-party call.

According to one aspect of the invention, the user of the device A wears the headset 716 while participating in the multi-party call. That is, the user of the device A 706 hears each of the other participants of the call through the headset 716. Here, it should be noted that the headset 716 includes a left speaker as well as a right speaker. To assist the user of the device A 706 in determining and distinguishing the different participants in the multi-party call, directional audio processing can be utilized so that the different sources of audio for the call can be directionally placed in a particular location with respect to the headset 716. As a result, the user of the device A 706 hears the other participants in the multi-party call as sound sources originating from different locations.

Although the invention works well for a user wearing a headset, in other embodiments the user hears the audio from other two speaker apparatuses. In one implementation, the two speakers are provided as a pair of earphones. In another implementation, the two speakers are provided as a pair of speakers adjacent or embedded in a computer or a computer peripheral.

In one embodiment, the form factor for the portable communication devices 706-710 can be hand-held (or palm-sized) or pocket-sized devices. In one embodiment, the form factor of the portable communication devices is hand-held or smaller. The portable communication devices may, for example, be small and lightweight enough to be carried in one hand, worn, or placed in a pocket (of a user's clothing). Although the form factor is generally small and hand-held (or palm-sized), the configuration of the device can vary widely.

Figure 8A:
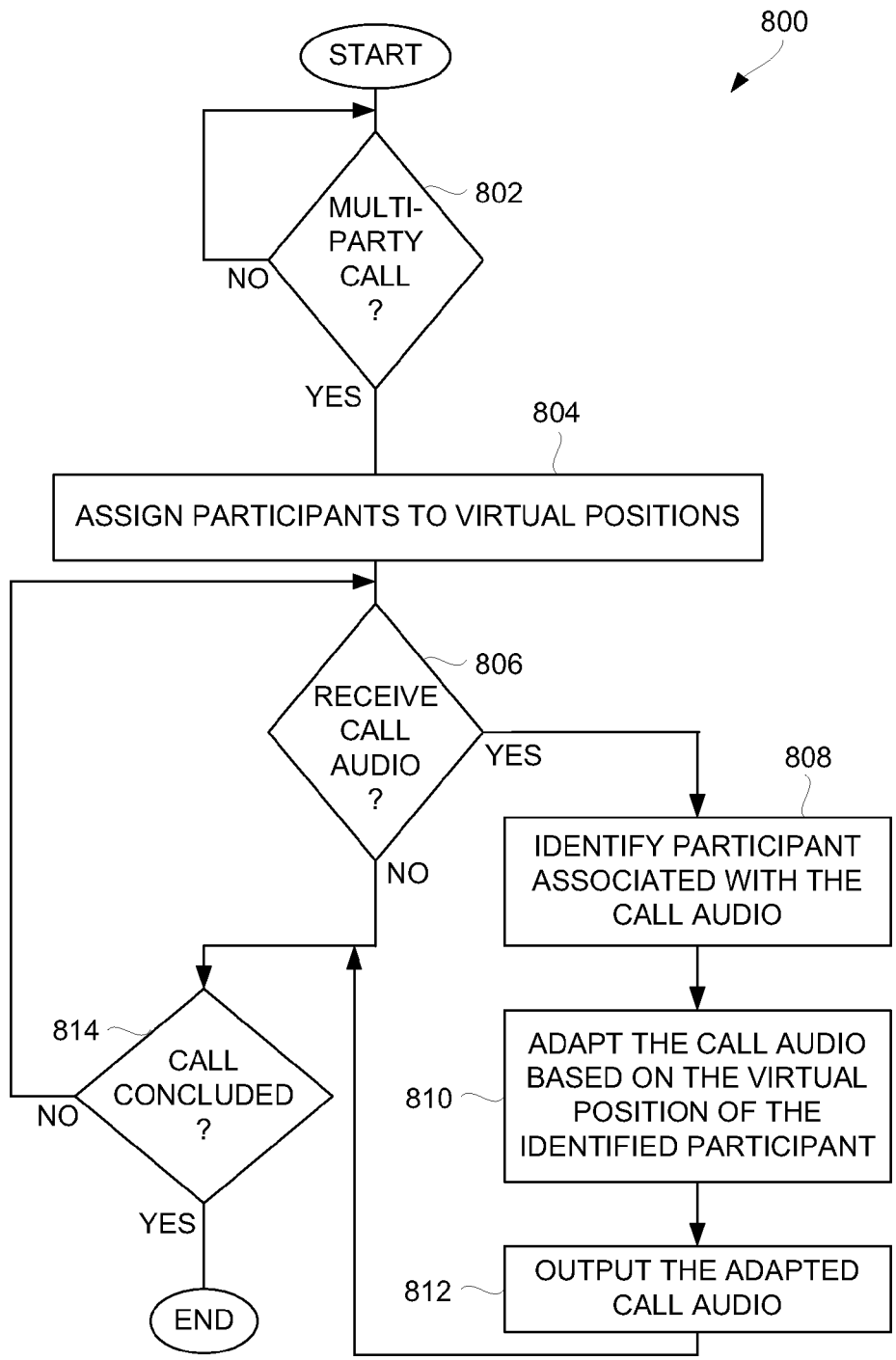
FIG. 8A is a flow diagram of a spatial conference process according to one embodiment of the invention.

FIG. 8A is a flow diagram of a spatial conference process 800 according to one embodiment of the invention. The spatial conference process 800 can, for example, be performed by an electronic device, such as any of the communication devices 706-712 illustrated in FIG. 7. Alternatively, the spatial conference process 800 can be performed by a central computing device residing in or coupled to a network, such as the wireless network 702 or the wired network 704.

The spatial conference process 800 begins with a decision 802 that determines whether a multi-party call exists. Here, the spatial conference process 800 is provided and described with respect to a particular electronic device, such as the portable electronic device 706 illustrated in FIG. 7. When the decision 802 determines that a multi-party call is not present, the spatial conference process 800 is not further performed. On the other hand, when the decision 802 determines that a multi-party call is present, the spatial conference process 800 continues. In other words, the spatial conference process 800 can be deemed invoked when a multi-party call is present.

When the decision 802 determines that a multi-party call is present, participants are assigned 804 to virtual positions. A decision 806 then determines whether call audio is being received. When the decision 806 determines that call audio is being received, the participant associated with the call audio is identified 808. The call audio can then be adapted 810 based on the virtual position of the identified participant. The adapted call audio is then output 812.

Following the block 812, as well as directly following the decision 806 when call audio is not being received, a decision 814 determines whether the call has concluded. When the decision 814 determines that the call has not yet concluded, the spatial conference process 800 returns to repeat the decision 806 and subsequent blocks. On the other hand, when the decision 814 determines that a call has concluded, the spatial conference process 800 ends.

Figure 8B:
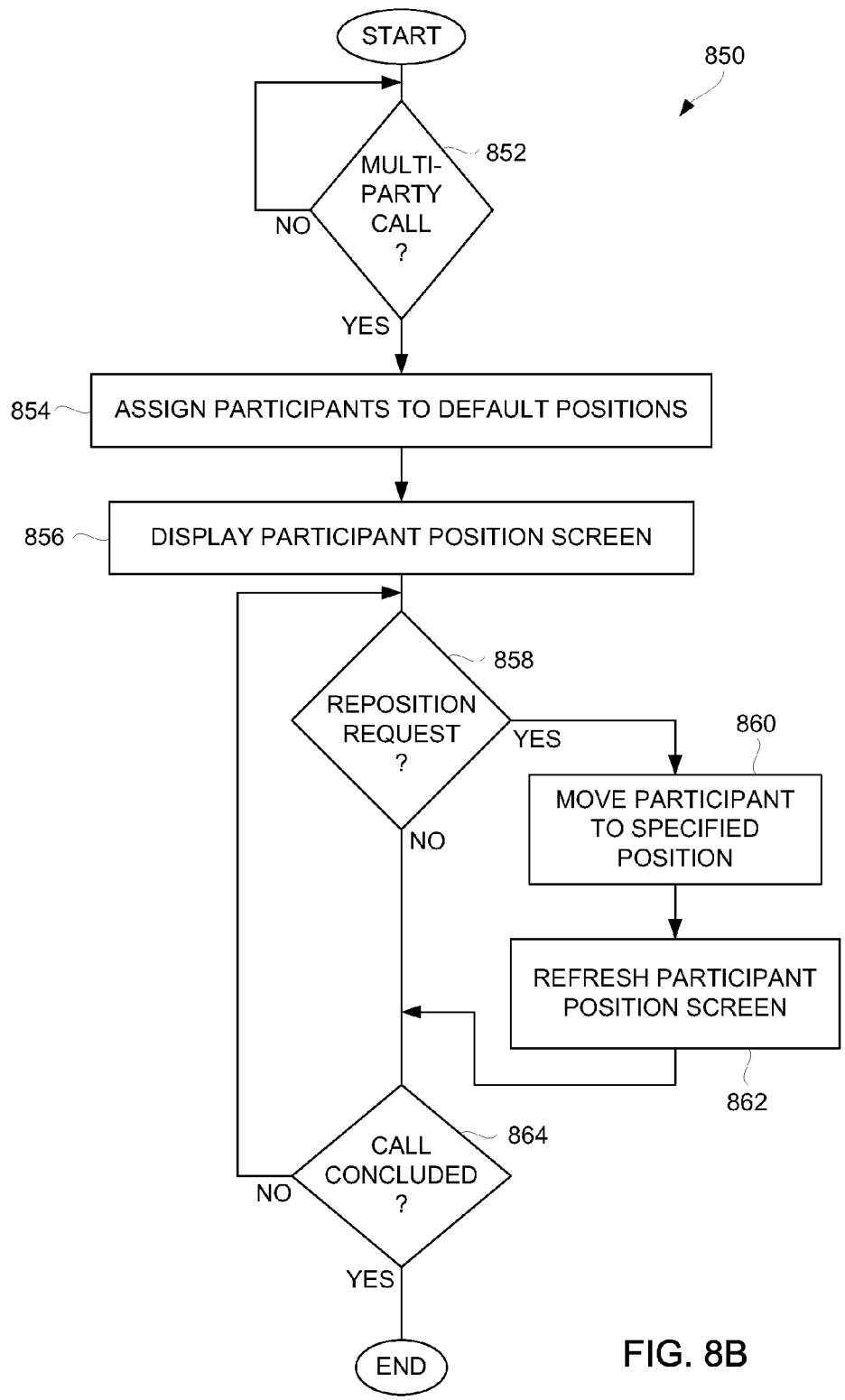
FIG. 8B is a flow diagram of a spatial conference process according to another embodiment of the invention.

FIG. 8B is a flow diagram of a spatial conference process 850 according to one embodiment of the invention. The spatial conference process 850 can, for example, be performed by an electronic device, such as any of the communication devices 706-712 illustrated in FIG. 7. Alternatively, the spatial conference process 850 can be performed by a central computing device residing in or coupled to a network, such as the wireless network 702 or the wired network 704.

The spatial conference process 850 begins with a decision 852 that determines whether a multi-party call exists. Here, the spatial conference process 850 is provided and described with respect to a particular electronic device, such as the portable electronic device 706 illustrated in FIG. 7. When the decision 852 determines that a multi-party call is not present, the spatial conference process 850 is not further performed. On the other hand, when the decision 852 determines that a multi-party call is present, the spatial conference process 850 continues. In other words, the spatial conference process 850 can be deemed invoked when a multi-party call is present.

When the decision 852 determines that a multi-party call is present, participants are initially assigned 854 to default positions. Here, the default positions can be assigned 854 in a variety of different ways. In one implementation, the assignment to the default positions is automatic. In one implementation, the participants can be assigned 854 to a default position based on their geographic location relative to the location of the host party, which refers to the user of the portable electronic device 706. Alternatively, the default position could be assigned 854 based on an order at which the participants joined the multi-party call.

Next, a participant position screen is displayed 856. The participant position screen can enable a user (such as the user of the portable communication device 706) to alter the position of one or more of the participants to the multi-party call. Here, the participant position screen is displayed 856 such that a user of the portable communication device can manipulate or otherwise cause one or more of the positions associated with the participants to be changed. In doing so, the user, in one embodiment, can cause the physical movement of a representation of a participant on the participant position screen. Here, a decision 858 determines whether a reposition request has been made. When the decision 858 determines that a reposition request has been made, the associated participant is moved 860 to the specified position. Typically, the user of the portable communication device would be the person that moves 860 a representation of the associated participant to the specified position. In response to the movement 860, the participant position screen is refreshed 862. In one implementation, the refreshing 862 is provided as the representation of the associated participant is moved 860.

Following the block 862, or directly following the decision 858 when a reposition request has not been made, a decision 864 determines whether the multi-party call has concluded. When the decision 864 determines that the multi-party call has not been concluded, the spatial conference process 850 returns to repeat the decision 858 and subsequent blocks so that repositioning can be achieved if desired. Alternatively, when the decision 864 determines that the multi-party call has been concluded, the spatial conference process 850 ends.

Figure 9:
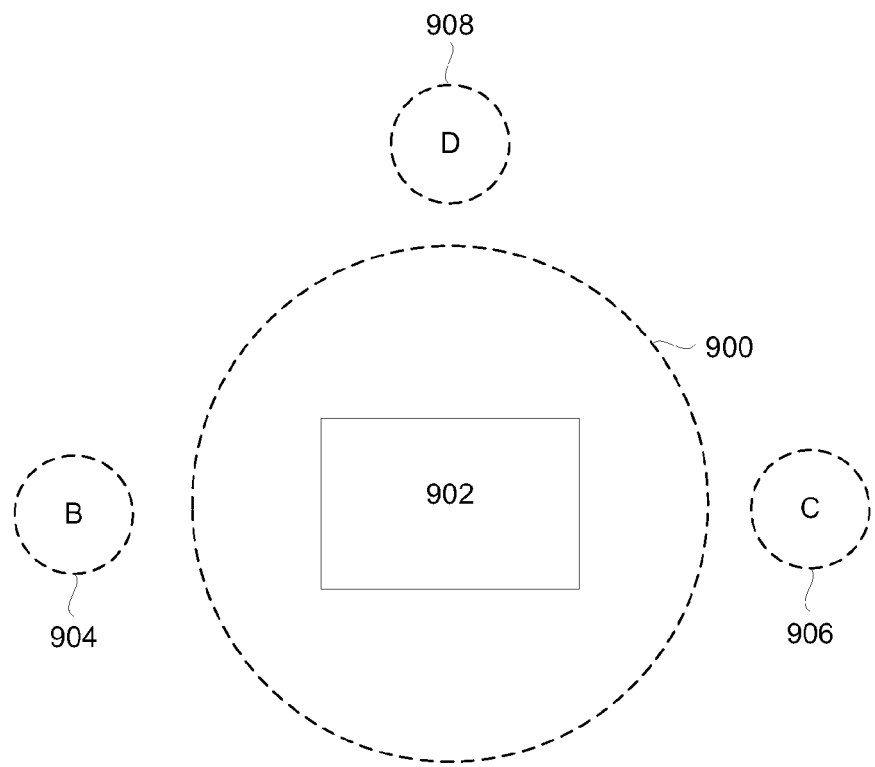
FIG. 9 is a diagram of a virtual space for a multi-party conference call according to one embodiment of the invention.

FIG. 9 is a diagram of a virtual space 900 for a multi-party conference call according to one embodiment of the invention. The virtual space 900 is provided with reference to a headset 902. In this example, the multi-party call is between four participants. The host participant can be deemed associated with device A and the headset 902 coupled thereto. The other participants are associated with devices B, C and D. According to one arrangement for a multi-party call, the virtual space 900 illustrates that the device B is placed at a virtual position 904, the device C is placed at a virtual position 906, and the device D is placed at a virtual position 908. Consequently, the user of the device A (and thus the headset 902) while participating in the multi-party conference hears the user of the device B as originating from the virtual location 904. In addition, the user of the device A (and thus the headset 902) would hear the audio provided by the device C as originating from the virtual location 906. Still further, the user of the headset 902 hears the user of the device D as originating from the virtual location 908. Hence, the user of the device A (and thus the headset 902) would hear the audio provided by the device B as originating from one side (e.g., left side). Similarly, the user of the device A (and thus the headset 902) would hear the audio provided by the device C as originating from an opposite side (e.g., right side). In addition, the user of the device A (and thus the headset 902) would hear the audio provided by the device D as originating from a forward direction. Although the virtual space 900 is provided with reference to a headset 902, the virtual space can also be provided for other two speaker arrangements.

Figure 10A:
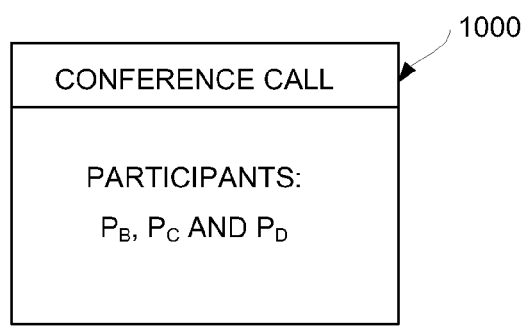
FIG. 10A is a representation of a conference call screen according to one embodiment of the invention.

FIG. 10A is an exemplary representation of a conference call screen 1000 according to one embodiment of the invention. The conference call screen 1000 indicates that participants $P_B$, $P_C$ and $P_D$ are participating in the multi-party conference call. The conference call screen 1000 can be associated with and presented on a communication device, such as the portable communication device 706 illustrated in FIG. 7.

Figure 10B:
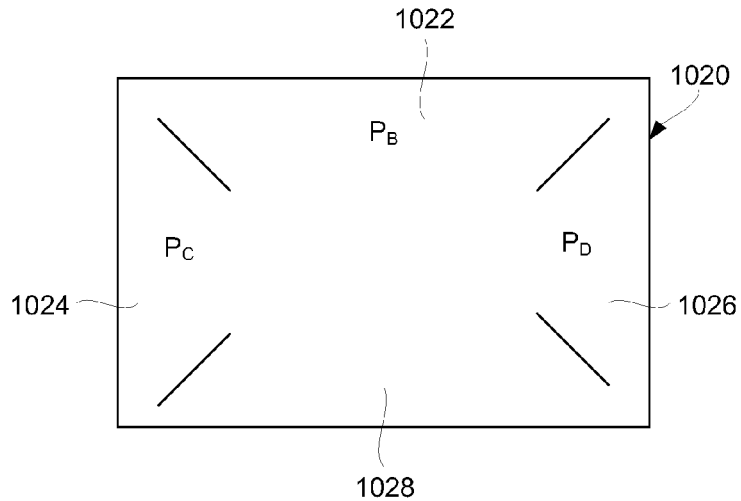
FIG. 10B is a diagram of an exemplary representation of a multi-party participant position screen according to one embodiment of the invention.

FIG. 10B is a diagram of an exemplary representation of a multi-party participant position screen 1020 according to one embodiment of the invention. The multi-party participant position screen 1020 illustrates positioning of visual representations of the participants to a multi-party call to locations of the multi-party participant position screen 1020. For example, the participant $P_B$ is placed in a top portion 1022, the participant $P_C$ is placed at a left portion 1024, and the participant $P_D$ is placed a right portion 1026. The bottom portion 1028 does not include any participant in this example. The participant position screen 1020 can be associated with and presented on a communication device, such as the portable communication device 706 illustrated in FIG. 7. A user can also be permitted to interact with the portable communication device providing the portable communication device so as to cause the visual representations of one or more of the participants to move to a different portion. For example, the user can provide user input so that the participant $P_B$ is moved from the a top portion 1022 to the bottom portion 1028.

Figure 10C:
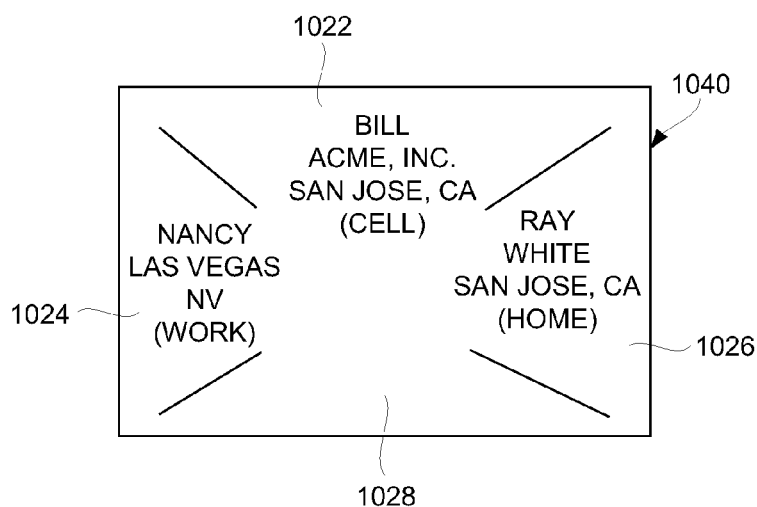
FIG. 10C is a diagram of a multi-party participant position screen including participant information according to one embodiment of the invention.

FIG. 10C is a diagram of a multi-party participant position screen 1040 including participant information according to one embodiment of the invention. The participant position screen 1040 illustrates the same portions 1022-1028 as in the multi-party participant position screen 1020 illustrated in FIG. 10B. In FIG. 10C, the multi-party participant position screen 1040 displays information concerning each of the participants to the multi-party call. As an example, the information on the participants can include: name, company, location and type of communication device. For example, the location can pertain to the company address, their home address or their actual position. Their actual position, for example, can be acquired by a Global Positioning System (GPS) device associated with the participant. The type of communication device being utilized by the participant can also be denoted, such as cell phone, work phone, home phone, work computer, etc. Beyond the information displayed in the portions 1022-1026 as shown in FIG. 10C, the portions 1022-1026 can also display the visual representations of the participants similar as in the participant position screen 1020 of FIG. 10B.

Figure 10D:
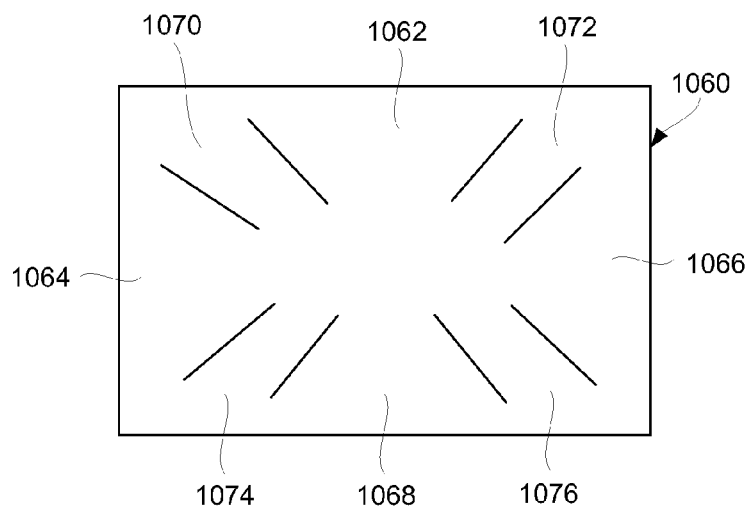
FIG. 10D is a diagram of another exemplary representation of a multi-party participant position screen according to one embodiment of the invention.

In the event that there are more than four participants, a larger number of portions can be used. FIG. 10D is a diagram of another exemplary representation of a multi-party participant position screen 1060 according to one embodiment of the invention. The multi-party participant position screen 1060 provides distinct portions 1062-1076 that can be used to spatially distinguish up to eight different participants. Visual representations and/or information can be displayed in these portions 1062-1076. A user can also be permitted to interact with the portable communication device so as to cause the visual representations of one or more of the participants to move to a different portion.

As discussed above, incoming audio from a participant is adapted so that when output to speakers associated with an electronic device, the audio sounds as if it originates from a particular direction. The particular direction is from a virtual position. With multiple participants, different participants are associated with different virtual positions and thus different participants have their audio appear to originate from different directions.

In one embodiment, the electronic device or central computing device can automatically identify the different participants and appropriately adapt their audio so as to appear to originate from a corresponding virtual location. In doing so, the electronic device or the central computing device can operate to distinguish audio from the different participants through a variety of means. In one implementation, the audio from a particular participant can be distinguished using a network address associated with a digital transmission of the audio. In another implementation, voice recognition technology can be utilized to distinguish the different participants. For example, each participant can provide a sample of their voice to the system, then the system can thereafter match incoming audio with one of the participants using the voice samples. In still another implementation, a unique code can be used by each of the participants and transmitted with the audio. The unique code can be on a separate channel (e.g., back channel or control channel). Alternatively, the unique code can be sent as audio in a coded manner or in a frequency band beyond user's hearing.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, memory cards, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a user of an electronic device, even a portable electronic device, can receive media playback while participate in a voice call. Another advantage of the invention is that audio can be mixed and transmitted along with audio for a voice call. Still another advantage of the invention is that different virtual spatial locations can be associated with different participants of a multi-party call.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for spatially distinguishing each of a plurality of other participants in a multi-party call on a communication device having associated therewith at least two speakers available for audio output, the multi-party call being with a user of the communication device and each of the plurality of other participants, said method comprising:

assigning each of the plurality of other participants to corresponding virtual spatial positions;

receiving call audio from one of the other participants during the multi-party call;

adapting the call audio received from the one participant based on the virtual spatial position corresponding to the one participant;

concurrent with the adapting, assigning an audio playback of a media item to an unassigned virtual position so as to distinguish the call audio and the audio playback; and concurrently presenting the adapted call audio and the audio playback of the media item on the at least two speakers, wherein the adapted call audio and the audio playback of the media item appear to the user to originate from different spatial locations.

2. A method as recited in claim 1, wherein said concurrently presenting comprises sending separate audio signals to the at least two speakers.

3. A method as recited in claim 1, whereby the resulting audio output produced by the at least two speakers sounds as if it originates from the corresponding virtual spatial position associated with the one participant producing the audio call.

4. A method as recited in claim 1, wherein the communication device is a mobile telephone.

5. A method as recited in claim 1, wherein the first and second speakers are part of earphones or a headset operatively connected with the portable electronic device.

6. A method as recited in claim 1, wherein said assigning is automatically performed.

7. A method as recited in claim 6, wherein said assigning is automatically performed based on geographic locations of the participants.

8. A method as recited in claim 1, wherein said assigning is performed by user input with respect to the communication device.

9. A portable communication device having at least two speakers available for audio output, said portable communication device comprising:
    a communication subsystem that supports a multi-party call, the multi-party call being between a user of the portable communication device and a plurality of other participants; and
    an audio manager operatively connected to said communication subsystem, said audio manager operating to assign the participants to virtual spatial positions, receive call audio from the participants during the multi-party call, adapt the call audio by the participants based on the virtual spatial positions corresponding thereto, assign an audio playback of a media item to another of the virtual spatial positions, adapt the call audio based on the virtual spatial position assigned to the audio playback of the media item, and send the adapted call audio to the at least two speakers.

10. A portable communication device as recited in claim 9, wherein said portable communication device further comprises:
    an audio playback subsystem that plays back one or more stored media items.

11. A portable communication device as recited in claim 10, wherein said audio manager further operates to determine whether audio playback of a stored media item is to be provided while engaging in a call, and directing audio output so that a user of the portable communication device can hear not only the call but also the audio playback of the stored media item when it is determined that the audio playback is provided while engaging in the call.

12. A portable communication device as recited in claim 10, wherein the at least two speakers are associated with a headset that operatively connects to said portable communication device.

13. A portable electronic device as recited in claim 9, wherein the at least two speakers are parts of earphones.

14. A method for handling a video call on a portable electronic device having a wireless communication interface, the method comprising:
    playing a video on the portable electronic device;
    establishing a video call with another party via the wireless communication interface; and
    continuing to play the video during the video call by reassigning audio portions of the video and the video call such that audio from the video is directed to a first audio channel and audio from the video call is directed to a second audio channel.

15. The method of claim 14, wherein the video is played from a library of media items stored on the portable electronic device.

16. The method of claim 14, wherein the video is played via streaming over the wireless communication interface.

17. The method of claim 14, further comprising:
    assigning participants of a video conference call to virtual positions;
    receiving call audio and call video from the participants during a multi-party call;
    adapting the call audio by the participants based on the virtual positions corresponding thereto; and
    adapting the call audio based on the video being played.

18. The method of claim 14, further comprising:
    receiving a user input that changes mixing of the playing video and the video call so that the relative output volumes are altered.

19. The method of claim 18, wherein the user input causes audio playback volume of the video to change inversely relative to the video call volume.

20. A portable communication device having at least two audio channels available for audio output, said portable communication device comprising:
    a communication subsystem that supports a video call; and
    an audio manager operatively connected to the communication subsystem, the audio manager operating to play a video on the portable communication device, establish a video call with another party via the communication subsystem, and continue playing the video during the video call by reassigning audio portions of the video and the video call such that audio from the video is directed to one of the audio channels and audio from the video call is directed to another of the audio channels.

21. The portable communication device of claim 20, wherein the communication subsystem supports a multi-party video call and the audio manager further operates to assign participants of a video conference call to virtual positions, receiving call audio and call video from the participants during a multi-party call, adapt the call audio by the participants based on the virtual positions corresponding thereto, and adapt the call audio based on the video being played.

22. The portable communication device of claim 20, wherein the first audio channel is a first speaker and the second audio channel is a second speaker.

23. The portable communication device of claim 20, wherein the first audio channel is a left channel and the second audio channel is a right channel.

24. A computer readable medium for storing in non-transitory tangible form computer instructions executable by a processor for spatially distinguishing each of a plurality of other participants in a multi-party video call on a communication device having associated therewith at least two speakers available for audio output, the multi-party video call being with a user of the communication device and each of the plurality of other participants, the computer readable medium comprising:
    computer code for assigning each of the plurality of other participants to corresponding virtual spatial positions;
    computer code for receiving call audio from one of the other participants during the multi-party video call;

computer code for adapting the call audio received from the one participant based on the virtual spatial position corresponding to the one participant;

computer code for, concurrent with the adapting, assigning an audio playback of a media item to an unassigned virtual position so as to distinguish the call audio and the audio playback; and computer code for concurrently presenting the adapted call audio and the audio playback of the media item on the at least two speakers, wherein the adapted call audio and the audio playback of the media item appear to the user to originate from different spatial.

25. The computer readable medium of claim 24, wherein the media item is a video.

26. The computer readable medium of claim 24, wherein the media item is an audio file.

27. The computer readable medium of claim 24, wherein the media item is streamed over a network.

* * * * *

UNITED STATES PATENT AND TRADEMARK OFFICE
CERTIFICATE OF CORRECTION

PATENT NO.         : 7,853,649 B2                                             Page 1 of 1
APPLICATION NO.    : 11/525670
DATED              : December 14, 2010
INVENTOR(S)        : Michael M. Lee et al.

It is certified that error appears in the above-identified patent and that said Letters Patent is hereby corrected as shown below:

In column 13, line 21-22, delete "the a" and insert -- the --, therefor.

Signed and Sealed this
Eighth Day of November, 2011

David J. Kappos
*Director of the United States Patent and Trademark Office*